Feb. 28, 1933.                    J. W. GRAY                      1,899,909
                          SHOCK ABSORBING MECHANISM
                   Filed July 22, 1932           3 Sheets-Sheet 2
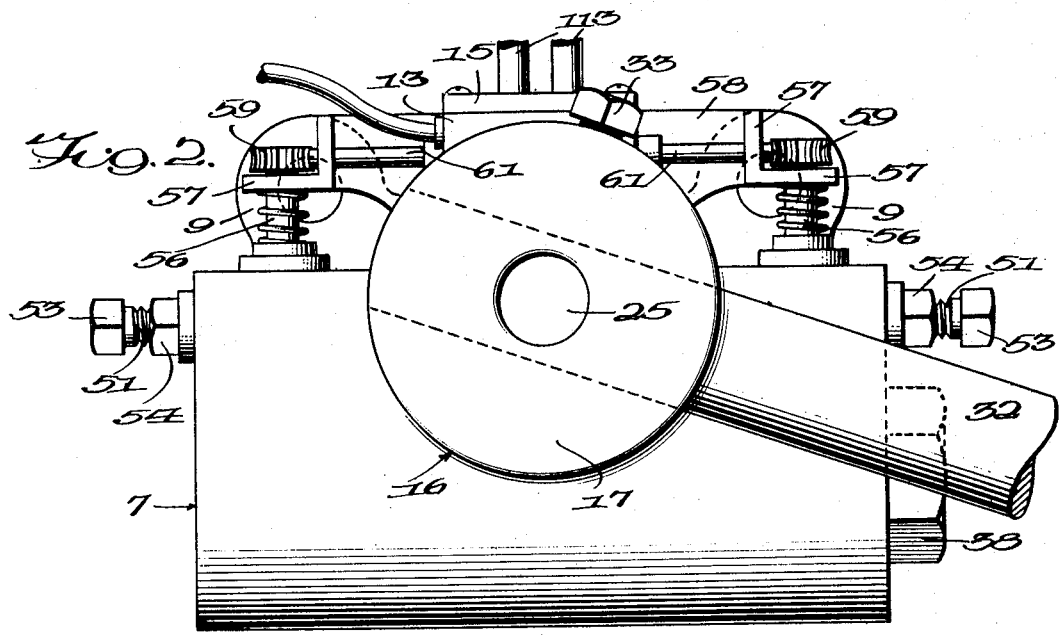
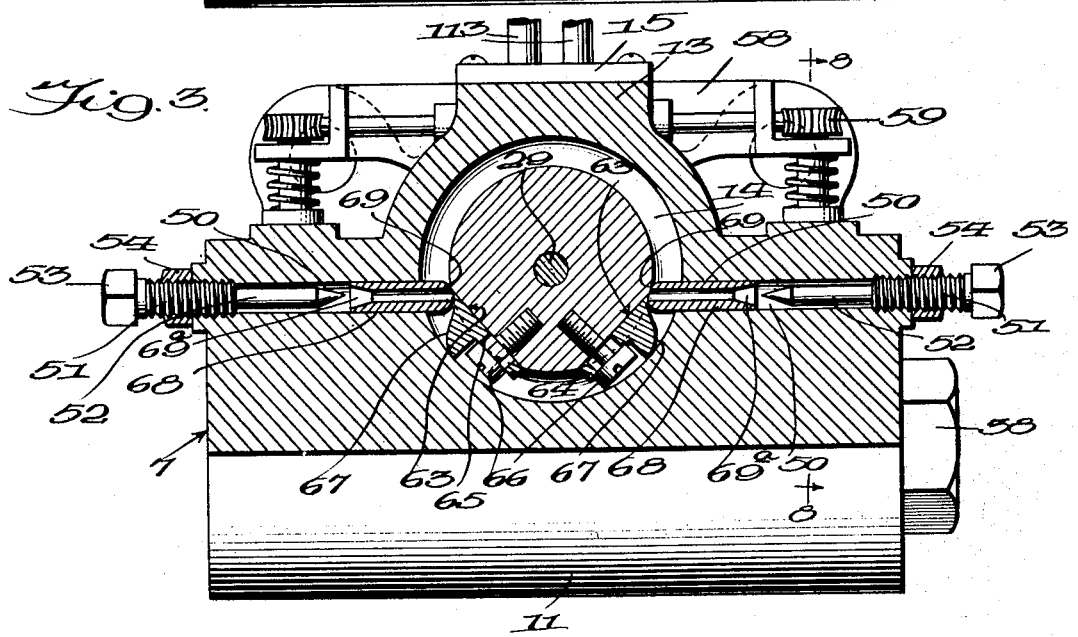
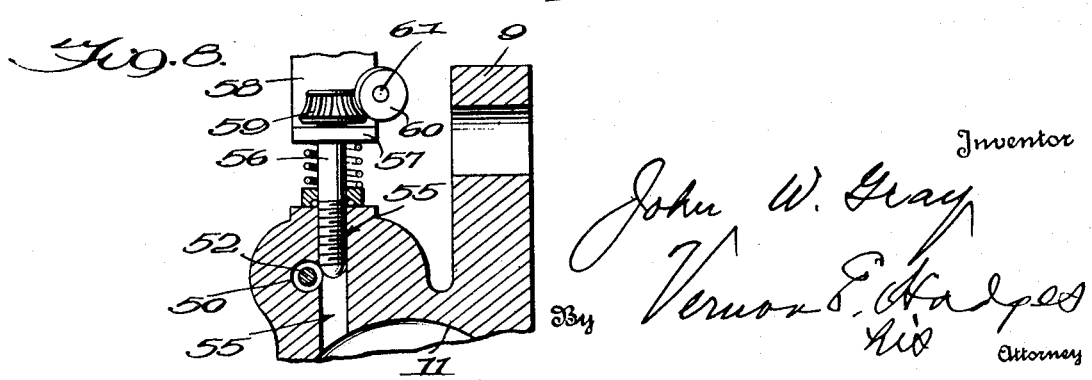
Inventor
John W. Gray
By Vernon E. Hodges
Attorney Feb. 28, 1933.    J. W. GRAY    1,899,909
SHOCK ABSORBING MECHANISM
Filed July 22, 1932    3 Sheets-Sheet 3
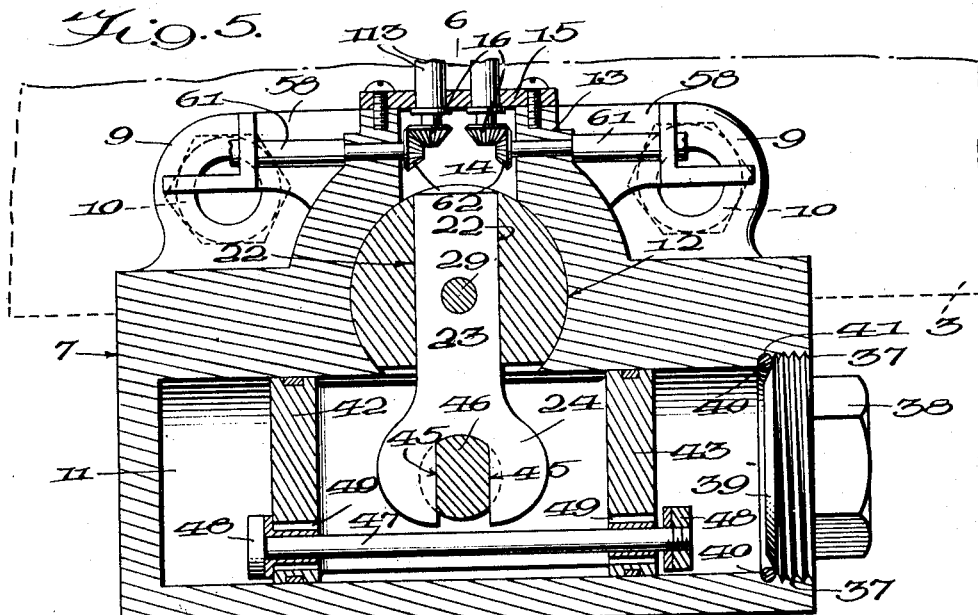
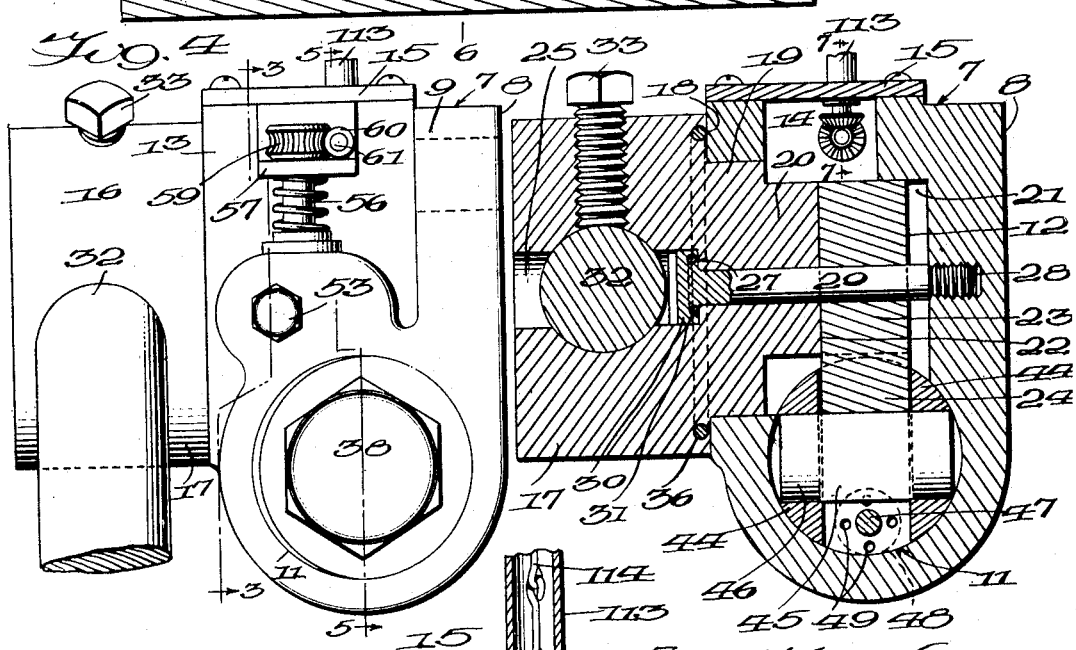
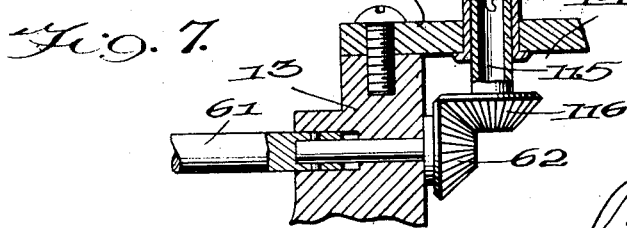
Inventor
John W. Gray
Vernon E. Kadgell
By    his Attorney Patented Feb. 28, 1933

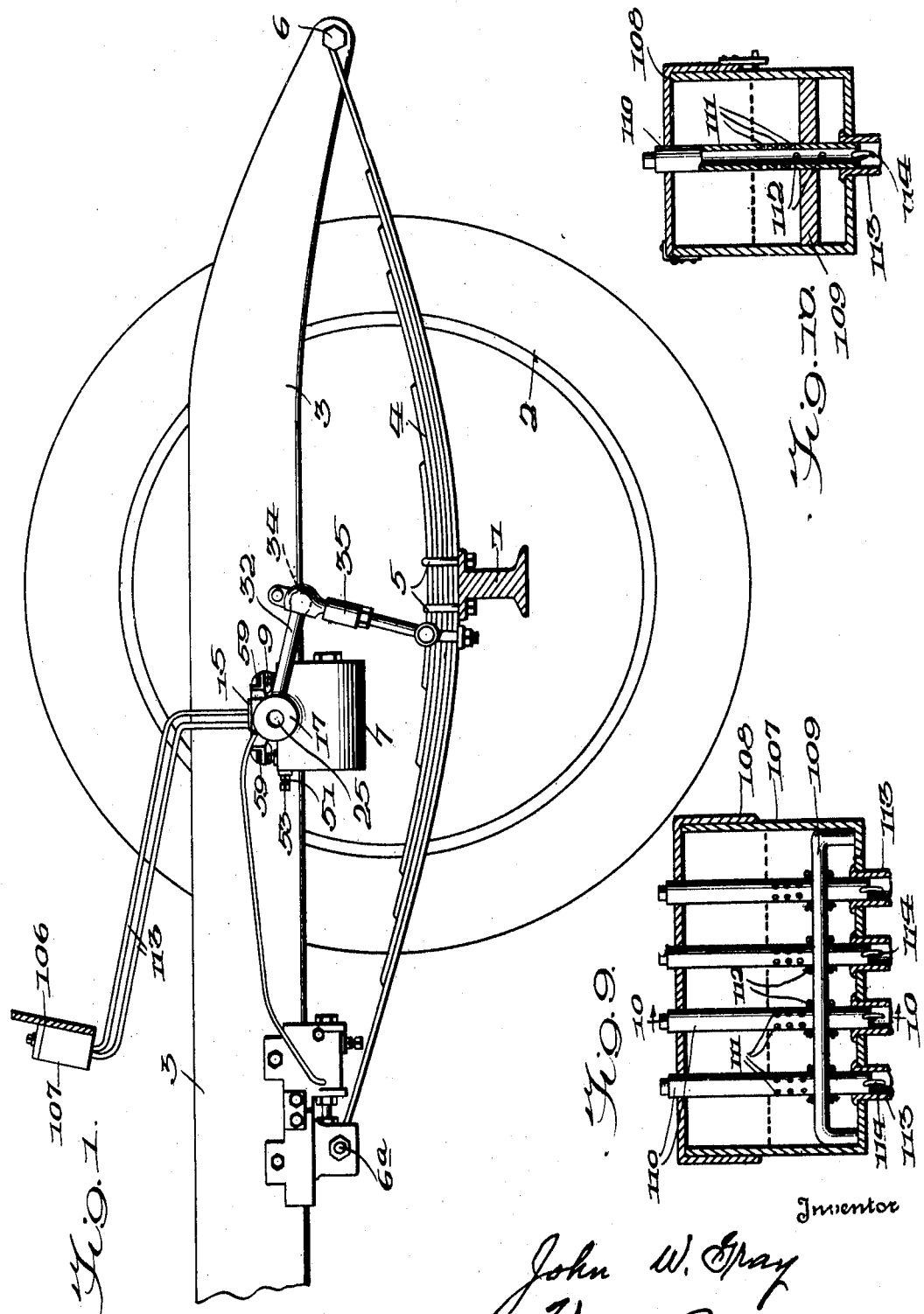

1,899,909

UNITED STATES PATENT OFFICE

JOHN WICKLIFFE GRAY, OF CHATTANOOGA, TENNESSEE, ASSIGNOR OF ONE-HALF TO BERNARD V. CURNEN, OF CHATTANOOGA, TENNESSEE

SHOCK ABSORBING MECHANISM

Application filed July 22, 1932. Serial No. 624,097.

This invention relates to shock absorbing equipment which will be most commonly used on and is therefore best illustrated in connection with motor vehicles, but which is applicable in principle to shock absorbing purposes generally. The invention is more particularly concerned with a fluid-type of shock absorbing equipment embodying novel features of adjustment and compensation and applicable generally to standard constructions of vehicles.

Shock absorbers are used generally to damp or cushion the vertical swing of a vehicle body due to shocks caused by impact of the wheels in depressions or elevations in the roadway. The amplitude of movement imparted to the running gear varies with the violence or force of the shock and the applied retarding or damping force applied through the shock absorber should be varied proportionately.

Since the spring suspension and weights of vehicle bodies have a direct bearing upon the amplitudes of shock imparted by relative movement of vehicle body and axle, it is highly desirable that provision be made for adjustment of the damping action of the shock absorbing equipment to make one size of equipment adaptable to widely varying sizes and weights of vehicle body and the accompanying differences in spring suspensions.

My invention consists in the provision of duplex shock absorbing equipment of the type described for damping both up and down movements and in the provision of independent separate adjustments as described making it possible to independently adjust for both of these movements. The initial downward body movement may, therefore, be gradually damped to lessen the violence of impact and the rebound more sharply checked by adjustment for increased damping resistance.

The shock absorbing equipment of motor vehicles as installed is designed or adjusted to provide for a determinate load—usually a full load of passengers or the weight capacity of a truck. The maximum benefit of the equipment is therefore, only obtained by adjusting its damping action to the load. This adjustment, with present day equipment requires usually a visit to a service station and the services of an experienced specialist.

Another feature of the present invention consists in the combination with shock absorbing equipment having a fluid cylinder secured to the frame or chassis of the body and provided with a fluid passage and a passage restricting valve member, of an adjusting means for said valve member projecting from the cylinder and a manually operable adjusting member therefor positioned upon the vehicle body for convenient operation by a vehicle driver or passenger and having operating connections extending below said body to the projecting adjusting means for the valve member.

Such an arrangement provides for convenient and quickly effected adjustment of the shock absorber to the load requirements and for unusual road conditions and permits the maximum benefits of shock absorbing equipment to be utilized without loss of time and continual labor expense.

Conveniently and as a related feature, the adjusting means may be combined with a fluid reservoir and liquid filling tubes by means of which an adequate supply of liquid fluid may be maintained in the shock absorber cylinder by automatically replenishing any liquid when the normal full supply is reduced by leakage, contraction, evaporation or other causes.

As shown, this result is attained by the provision of a flexible tube through which a flexible adjusting element, such as a chain, extends to the valve adjusting member, the upper end of the chain extending to a rotatable adjusting stud mounted on a liquid container through which the upper end of the tube extends and is perforated to admit liquid thereto, the lower end of the tube communicating with the interior of the shock absorber cylinder. The number of adjusting chains and tubes will, obviously, depend upon the number of cylinders to which the adjusting chains and tubes are to extend.

The structural embodiments providing the above described features and advantages are more fully described in the following detailed specification which is to be read in conjunction with the accompanying drawings forming part thereof and in which:—

Figure 1 is a view in side elevation of the front end of a motor vehicle chassis showing frame mounted shock absorber equipment constructed in accordance with the present invention and connected with the vehicle spring for damping relative vertical movement of body and axle, the adjustment and filling connections to a dash mounted fluid reservoir and adjustment box being also shown.

Figure 2 is a view in side elevation of the shock absorber connected between the chassis or body frame and the axle.

Figure 3 is a longitudinal vertical section through the absorber taken on line 3—3 of Figure 4.

Figure 4 is an end elevation of said absorber.

Figure 5 is a longitudinal transverse section therethrough taken on line 5—5 of Figure 4.

Figure 6 is a transverse vertical section through the cylinder and rotor of said absorber, taken on line 6—6 of Figure 5.

Figure 7 is a fragmentary vertical section through the adjusting gearing and fluid supply tube taken on line 7—7 of Figure 6.

Figure 8 is a fragmentary vertical section through the liquid return passage or by-pass of the cylinder taken on the line 8—8 of Figure 3.

Figure 9 is a longitudinal vertical section through the dash reservoir and adjustment box shown in Fig. 1.

Figure 10 is a transverse vertical section taken on the line 10—10 of Figure 9.

The shock absorbing equipment of the present invention, while specifically designed for application to motor vehicles and described and illustrated as used for this purpose, is applicable in principle to relatively movable parts where similar conditions and needs of damping occur.

In the use of the shock absorbing means with motor vehicles, it is preferable to apply the equipment to the vehicle at the four points of spring suspension for uniform results, although as is frequently done, the shock absorbing means may be applied to one end only of the vehicle or to both ends as desired.

In Figure 1 of the drawings, I have illustrated the application of one unit of the shock absorbing means to a motor vehicle at one side of its front end between chassis and wheel, the front axle being indicated at 1, the opposite front wheel at 2, the chassis or vehicle frame at 3, and the suspension spring at that side and end of the vehicle at 4, this spring being attached intermediate of its ends to the front axle 1 by the usual spring clips 5 and being hung at its front end from the frame 3 in the usual manner as by the usual connection 6, and at its opposite end by a longitudinal shock absorber connection 6a.

A cylinder block designated generically at 7 and shown in detail in Figures 2 to 7 is attached to the face of the frame 3 above the axle 1, and as shown in Figure 1, slightly rearwardly of the axle. This cylinder block as best seen in Figures 4 to 6 is mounted upon the face of the frame 3 and is provided with a flat rear face 8 (Figures 4 and 6) to engage the outer face of the frame and formed at its ends with ears 9 perforated to receive securing bolts 10 extending through the ears into the frame 3 and by means of which the cylinder block is supported from the frame. The lower portion of this block is formed with a cylinder bore 11 therein and is counter-bored at right angles to form a rotor bore 12 substantially centrally above the cylinder bore and communicating therewith at its base, this last named bore providing a fluid well as will be seen later. Between the ears 9, and inwardly thereof, the cylinder block is formed with a vertical enlargement 13 through the lower portion of which the rotor bore 12 extends, this enlargement having a central vertical bore 14 formed therein extending upwardly from the rotor bore and forming a fluid receiving space, which also houses certain valve adjusting gearing later to be described. The open top of the extension 13 through which the bore 14 extends is closed by a cover plate 15.

A rotor 16 having an external head 17 providing an inner bearing face 18 extends into the bore 12.

This rotor member inwardly of its head 17 is reduced in diameter to provide a bearing hub portion 19 engaging and bearing upon the surface of the block at the edges of the bore 12, and with a shank portion 20 which is further reduced in diameter and seats within the socket 21 at the inner end of the rotor bore 12 (see Figure 6). The extremity of the inner end 20 of the rotor is formed with a vertically extending slot 22 to receive the upper end of the shank of a piston operating bar 23, the lower end of which is enlarged at 24 and bifurcated.

The enlarged head 17 of the rotor is formed with an axial bore 25 reduced in diameter from its bearing hub portion and continuing through the rotor as a bore 26 of reduced diameter, the junction of the bore 26 with the outer portion 25 of the bore providing the shoulder 27. In axial alinement with the bore, the rear wall of the cylinder block is formed with a threaded socket 28 of corresponding diameter. The rotor is held in position in the bore 12 of the cylinder block by means of a stud 29 extending through the bore 26 and having its threaded inner end engaged in the threaded socket 28. The head 30 of the stud abuts the annular shoulder 27 of the pin bore and is formed on its inner face with an annular recess in which a compressible packing ring 31 is seated. The head of the pin is preferably slotted to permit its threaded end to be threadedly engaged with the socket 28 by means of a suitable tool, such as a screw driver, inserted through the bore 25 in the rotor head.

This head 17 is counter-bored to receive an operating crank arm 32 secured in adjusted position in the head by means of the set screw 33 tapped through the head and engaging the crank arm, this crank arm being inserted, obviously, after the pin 29 has been screwed into place to secure the rotor in the cylinder block.

The outer end of the crank arm 32 is formed or provided with a ball end 34 (see Fig. 1) seating in a socket formed in the upper end of a lever member, generically indicated at 35, which extends upwardly from the spring or axle.

In order to effect a fluid tight connection between the rotor head 17 and the side of the cylinder block against which its under face bears, the head 17 similarly to the head 30 of the rotor securing pin is formed with an annular recess in its face in which is seated a packing ring 36 of circular cross section and compressible material which is drawn into fluid tight engagement with the sides of the cylinder block through the action of the fastener pin 29.

One end of the cylinder bore 11, which may be drilled in the casting, is annularly enlarged and internally threaded at 37 and is closed by a screw plug 38 having a beveled inner edge 39 engaging and forcing a ring of compressible packing 40 against the shoulder 41 formed by the annular threaded enlargement 37 thereby providing means for effecting a fluid tight closure for the end of the cylinder bore.

Mounted in this bore 11 in spaced relation are pistons 42, 43 joined by side walls 44 externally curved to engage and guide upon the walls of the bore 11 and providing a fluid reservoir between the pistons open at the top and bottom and communicating with the fluid well in the rotor bore 12. The shank 23 of the depending rotor bar extends down through the opening between the upper ends of the side walls 44 and embraces with its bifurcated lower end 24 the intermediate squared sides 45 of a circular wrist pin 46 whose outer ends are journaled in transversely alining bores formed in the side walls 44. It will be obvious that movement of the crank arm 32 upwardly and downwardly with the relatively vertical movement between the axle 1 and frame 3 caused by depressions and elevations in the surface of a roadway will oscillate the rotor, and through the connecting bar 23, effect reciprocation of the duplex pistons 42, 43. These pistons are preferably provided with rings of usual construction in their peripheries insuring a fluid tight fit in the cylinder bore and in longtudinal alinement below the bifurcated end 24 of the connecting arm or rod 23 are bores in alinement to receive a check valve stem 47 extending therethrough and having threaded on its outer ends valve disks 48. Within the area of the pistons engaged between the valve disks are formed an annular series of fluid openings 49. The check valve stem 47 is of greater length than the spacing of the outer ends of the pistons 42, 43 so that it may slide relatively to the duplex connected pistons and bring one or the other of its valves 48 against the fluid passages 49 to close these passages in the opposite directions of movement of the pistons.

In other words when the pistons 42—43 are moved in unison toward the right in Figure 5, the check valve formed by the stem 47 and right hand disk 48 will close and the check valve formed by the other end of the stem 47 and the left hand valve disk 48 will open and vice versa, in the usual manner of check valves.

The fluid, such as heavy oil, glycerine, etc. with which the cylinder bore 11 is filled, is forced from one end of the cylinder by movement of the duplex piston toward that end through a fluid return passage leading back to the fluid reservoir between the pistons 42—43. This movement of the fluid is utilized and is restricted to damp the piston movement by similar means at each end of the cylinder block. In line with the shank portion 20 which lies outwardly of its slotted portion 22 housing the connecting rod 23, the cylinder block is provided with alined passages 50 as shown in Fig. 3 extending in opposite directions from the rotor bore 12 longitudinally of and through the block, the outer ends of these passages being internally threaded to receive the enlarged threaded shanks 51 at the outer ends of needle valves 52 adjusted inwardly and outwardly in the fluid passages 50 to a predetermined fixed point through the bolt heads 53 formed upon the outer ends of these shanks. Lock nuts 54 threading on the shanks 51 preferably have their under faces recessed to receive packing rings engaging bosses formed on the block at the outer ends of the fluid passages 50. These passages extend parallel with the axis of the cylinder bore 11 and communicate therewith through vertical fluid passages 55 extending at right angles and substantially tangentially to the bore as shown in Fig. 8 and through the upper side of the cylinder block.

These passages 55 are threaded and receive the threaded shanks 56 (Figure 8) of passage restricting valve members which extend freely through angle brackets 57 joined by webs 58 to the enlargement 13 of the cylinder. The upper ends of the threaded shanks 56 have fixed thereon worm gears 59 meshing with worms 60 (Figure 4) mounted upon the outer ends of counter-shafts 61 which extend through and journal in the vertical arms of the brackets 57 (Figures 2 and 3) with their inner ends extending through and journaling in the sides of the enlargement 13 of the cylinder block. The inner ends of the counter-shafts 61 mount bevelled gears 62 which are rotated through dash adjusting means which will be hereinafter described and operated through motion imparted by the counter-shafts 61, worms 60 and worm gears 59 to raise or lower the threaded valve stems 56 to cause their lower ends variably and predeterminately to restrict the openings joining the longitudinal fluid passages 50 with the vertical fluid passages 55. The valve stems 56 are intended to provide means for initially restricting the by-pass or return fluid passage connecting the cylinder bores at the opposite ends of the cylinder and of the travel of the pistons therein with the fluid reservoir between the pistons through the rotor well with which the longitudinal bore 50 communicates.

In addition to the damping action upon the piston stroke provided by this initial restriction of the fluid passage between the cylinder ends and the fluid return reservoir between the pistons, I have provided means actuated by movement of the rotor shank 20 for further and progressively restricting the fluid passage in proportion to the degree of movement of the crank arm 32 and the rotor 20, this degree or amplitude of movement being directly proportioned to the relative vertical movement of the vehicle axle and frame, which in turn is proportioned to the shock produced by the wheels of the vehicle encountering an elevation, depression, or other obstruction in the roadway. This means is covered in my Patent No. 1,799,013, and in my reissue application Serial No. 570,989, filed October 24. 1931.

Accordingly, and referring more particularly to Figure 3, it will be seen that the portion 20 of the rotor alining with the fluid passage 50 is provided with substantially adjacent flattened peripheral faces 63 at the lower side of the rotor portion 20. Seating upon these flattened portions are plates 64 having longitudinal slots 65 therein for adjustment of the plates circumferentially of the rotor portion 20. Adjusting screws 66 have their shanks extending through the slots in these plates and tapped into bores extending angularly into the rotor portion 20, the heads of these bolts overlying the sides of the slots in the plates and clamping them on their seats on the rotor. The upper ends of these plates, as viewed in Figure 3, are formed with curved outer faces presenting cams 67 curving outwardly from the periphery of the rotor 20 toward the outer wall of the rotor well and terminating within the area of the well to permit oscillation of the rotor.

Cooperating with these cams are tubular valve members 68 slidably fitting in the fluid passages 50 and having rounded inner ends 69 making a line contact with the cams 67. These tubular valve members extend a substantial distance in the fluid passages 50 and have their bores formed with outwardly flaring outer ends 69a which cooperate with the tapered or conical ends of the needle valves 52, previously described, which form, in effect, valve seats and cooperate with the flaring outer ends 69a to restrict further the fluid passage. This action will be clearly seen from the showing in Figure 3 from which it follows that oscillation of the rotor 20 upwardly to the right as viewed in that figure will cause the cam 67 to engage the rounded inner end 69 of the tubular valve member 68 at the right side and force it progressively outwardly toward the right, bringing its flared outer end toward and over the conical end of the needle valve 52 and progressively restricting the fluid passage through its bore as the pointed end of the needle valve enters more and more into the flared end of the bore of said tubular member. These tubular valve members 68 have a snug sliding fit in the passages 50 so that fluid is compelled to pass through the central bores of the tubular members in order to reach the fluid well formed within the rotor bore 12 between the walls of the bore and the periphery of the portion 20 of the rotor. The point at which the tubular members begin to restrict the passage of fluid from the ends of the cylinder bore through the passages 50 may be predeterminately varied by adjustment of the needle valves 52 through their projecting outer ends 53.

Movement of the duplex piston 42—43 toward the right, for example, occurs upon the initial downward movement of the frame 3 relatively to the axle 1 due to the initial compression of the suspension spring 4 by road shock. Reverse movement or rebound swings the piston 42—43 to the left as viewed in Figure 5. Since the adjustments of the restricting valves 56 and 52 and of the cam plates 64 are independent, the damping action afforded by restriction of the fluid passages 50—55 may be made different for the rebound stroke from those provided for the initial downward movement. Three points of adjustment are provided, therefore, for each of the two opposite and relatively vertical movements of the body and axle. The adjustable mounting of the crank arm 32 in the head 17 of the rotor through set screw 33 permits one size and form of shock absorber cylinder to be adapted to different sizes and forms of vehicle bodies. The device, of course, can be manufactured in a standardized form for one particular vehicle chassis and with the crank arm fixed to the rotor and the adjustment omitted. In such an instance, the rotor and crank arm can be formed as a single integral member with the mass of the rotor head 17 reduced.

It will be realized that shock absorbing equipment such as described is initially adjusted for average load and road conditions when installed upon a motor vehicle. To secure the maximum benefits of the equipment for varying conditions of roadway, variation in adjustment is required. This change in adjustment as ordinarily effected at a service station is impractical in traveling over the road.

I have provided means, however, which is readily operated by the driver as from the dash, by means of which the restriction of a fluid passage and the damping or shock absorbing action resulting therefrom may be varied almost instantly to suit road conditions as encountered and conveniently be combined with the adjusting means. A liquid reservoir and filling system for maintaining the cylinders filled with fluid and therefore fully effective at all times, is conveniently mounted upon the vehicle, as shown. The dash 106 (Figure 1) mounts a combined valve adjusting and cylinder filling box 107 shown in detail in Figures 9 and 10. This box is preferably provided with a removable cover 108 and with a positioning partition plate 109 fixedly secured to its interior and spaced from its bottom. This plate, the cover of the box, and its bottom are provided with a series of longitudinally extending vertically alined holes through which extend a series of vertical filling and valve adjusting tubes 110, the upper ends of which are formed for manual turning adjustment and project above the top of the cover. Above the partition 109, the tubes have a series of oil openings 111 therein and are supported in determinate vertical position within the box by means of cotter pins 112 inserted therethrough above the top of the partition 109. The openings in the bottom of the reservoir box 107 are made of greater diameter than the tubes 110 to receive the ends of flexible tubes 113 which extend into the box 107 and are flanged to seat thereover.

These tubes depend from the box 107 through the floor of the vehicle body and extend through the top cover plates 15 of the shock absorber cylinder blocks 7. They are used to convey the fluid from the reservoir 107 into the fluid receiving chamber at the top of the cylinder block, previously described, and also to house motion transmitting chains or cables 114 secured to the lower end of the adjusting tubes 110 which extend down within the upper ends of the flexible tubes 113. These adjusting chains, as shown in detail in Figure 7, extend to the lower ends of the tubes 113 and are coupled to the upper ends of tubular shafts 115 whose shanks are journalled in the lower ends of the flexible tubes 113 and whose lower ends are provided with bevelled gears 116 meshing with the bevelled gears 62 on the countershafts 61. The oil or other fluid from the combined valve adjusting the cylinder filling box 107 will flow by gravity through the tubes 113 into the fluid receiving chamber of the cylinder blocks and through the fluid well in the rotor bore to the cylinder to maintain a full supply of fluid therein at all times.

Since the pair of valve stems 56 in cylinder block 7 controlling the relative vertical movement of the axle and frame are independently adjustable, two tubes 113 and two chains 114 are used for each cylinder unit.

Adjustment of a dash control tube 113 will, through the chain 114, pair of beveled gears 62, 116 and gears and worms 59, 60, rotate the stems of a needle valve 56 at one or the other end of the cylinder to vary its fluid passage restricting position and thereby vary the damping action of the shock absorber for upthrust as required by the particular condition of the road being traversed or by a change in the load on the vehicle so that the damping or shock absorbing action provided by the double acting shock absorbers 7 may be almost instantly varied to suit the temporary requirements of travel and road conditions.

The operation of the shock absorbing equipment described therein is believed to have been clearly stated in the foregoing and need not be recapitulated here in detail. It might be stated that the tubular valve members 68, best seen in Figure 3, require no means for forcing them against the cams 67 other than the pressure of the fluid forced by the pistons 42—43 through passages 55 and 50 thereagainst, this pressure serving to maintain the rounded ends 69 of the tubular valve members in contact with the cams 67 at all times.

The specific embodiment of the invention and its structural details as disclosed herein represents a preferable form, illustrative of the invention but not intended as restrictive thereof. This form is subject to modification and adaptation to suit varying conditions of manufacture and application within the spirit of the invention and the scope of the appended claims.

What I claim, therefore, and desire to secure by Letters Patent is:—

1. In a vehicle, the combination with a chassis, of a hydraulic shock absorber therefor, and remote control means constructed and arranged to damp at least one-half its range of oscillatory motion independently of the other half.

2. In a vehicle, the combination with a chassis, of a hydraulic shock absorber therefor having a piston mounted therein for oscillatory motion, means for damping said oscillatory motion in one direction independently of its motion in the other direction, and means extending to a remote portion of the vehicle constructed and arranged to control said damping means.

3. In a vehicle, the combination with a chassis, of a hydraulic shock absorber for the chassis having a piston mounted therein for oscillatory motion, separate means for damping the oscillatory motion of impact and recoil, and means extending to a remote portion of the vehicle constructed and arranged to control at least one of said damping means relative to the other.

4. In a vehicle, the combination with a chassis, of a hydraulic shock absorber for the chassis having a piston mounted therein for oscillatory motion of impact and recoil, at least one means for damping the impact motion, separate means for damping the recoil motion, and means extending to a remote portion of the vehicle constructed and arranged to control at least one-half the range of said oscillatory motion relative to the other half.

5. In a vehicle, the combination with a chassis, of a hydraulic shock absorber for the chassis having a piston mounted therein for oscillatory motion of impact and recoil, and means extending to a remote portion of the vehicle constructed and arranged for creating a differential in damping action between the impact and recoil motions.

6. In a vehicle, the combination with a chassis, of a hydraulic shock absorber for the chassis having a piston mounted therein for oscillatory motion of impact and recoil, damping means for said oscillatory motion constructed and arranged to establish and maintain a variable ratio of differential in damping action between the impact and recoil motions, and means extending to a remote portion of the vehicle to control said damping means.

7. In a shock absorber, the combination of means mounted for oscillatory motion of impact and recoil, means for effecting variable ratios of resistance for impact and recoil motions, and remote control means for varying at least one of said motions relative to the other.

8. In a hydraulic shock absorber adapted to be attached to one relatively movable part of a vehicle, the combination of means mounted in said shock absorber for oscillatory motion and adapted to be connected with another relatively movable part of said vehicle, and a remotely controlled valve assembly constructed and arranged for damping one-half only of each oscillatory motion between the relatively movable parts of the vehicle.

9. In a vehicle, the combination with a chassis, of a plurality of hydraulic shock absorbers therefor, each shock absorber being constructed for dual impact and recoil oscillatory motion and having separate valve assemblies for the dual impact and recoil motions of each oscillation thereof, and remote control means extending to a remote portion of the vehicle and connected with the valve assemblies to adjust said valve assemblies to different ratios of resistance between said dual motions.

10. In a hydraulic shock absorber, the combination of means mounted for dual oscillation in response to impact and recoil, separate means for regulating the ratios of resistance of impact and recoil, and a remotely extending activator for at least one of said regulating means.

11. In a vehicle, the combination of a shock absorber having a piston mounted therein for oscillatory motions of impact and recoil, separate valve means for damping said motions relative to each other, and flexible means connected with one of the valve means and extending from the shock absorber to a remote portion of the vehicle, constructed and arranged for manual adjustment to adjust the valve means connected therewith and control one of said motions relative to each other.

12. In a vehicle, the combination of a shock absorber having a piston mounted therein for oscillatory motions of impact and recoil, separate valve means for damping said motions relative to each other, and manually adjustable flexible means connected with each of said valve means and extending from the shock absorber to a remote portion of the vehicle, said flexible means being constructed and arranged to independently and manually adjust said valve means relative to each other.

13. In a fluid controlled damping device the combination of a housing having a cylinder therein, a double-acting piston mounted in the cylinder, and providing compression chambers in opposite ends of the cylinder, said housing having a central fluid chamber and having ducts leading from the compression chambers to said central chamber, a valve for controlling each of said ducts, gearing for adjusting said valves, and flexible actuating means connected with the gearing.

14. The combination with a hydraulic shock absorber having oscillatory means therein, and a valve for adjusting the oscillatory motion of said means, of a fluid reservoir externally of the shock absorber, a fluid duct extending from the reservoir to the shock absorber, and flexible means extending through said duct and connected with the valve for adjusting said valve.

15. The combination with a hydraulic shock absorber having oscillatory means therein, and adjustable damping means therefor, of a main fluid reservoir externally of the shock absorber, a fluid duct extending from said reservoir to the shock absorber, and means extending through said fluid duct for adjusting the damping means.

16. The combination with a plurality of hydraulic shock absorbers having means mounted therein for oscillatory motion, and adjustable means for damping said motion, of a main fluid reservoir spaced from said shock absorber, a plurality of fluid ducts extending from the reservoir to the shock absorbers for directing replenishing fluid thereto, and means extending through said fluid ducts for adjusting the damping means.

17. A shock absorber comprising a housing having a pressure chamber, and a duct leading therefrom, a valve member within the duct for metering escaping fluid from the pressure chamber and regulating the pressure ratios therefrom, and rotatably mounted flexible means externally of the housing and rigidly fixed to the valve member and constructed and arranged for remotely and rotatably adjusting the valve member by turning movement of said flexible means and holding the valve member positioned at a predetermined opening.

In testimony whereof I affix my signature.

JOHN WICKLIFFE GRAY.